United States Patent
Kruayatidee et al.

(10) Patent No.: US 11,526,339 B1
(45) Date of Patent: Dec. 13, 2022

(54) SYSTEMS AND METHODS FOR IMPROVING APPLICATION INSTALLATION

(71) Applicant: NortonLifeLock Inc., Tempe, AZ (US)

(72) Inventors: Somard Kruayatidee, Culver City, CA (US); Jonathon Salehpour, Culver City, CA (US); Bruce McCorkendale, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 198 days.

(21) Appl. No.: 16/990,927

(22) Filed: Aug. 11, 2020

(51) Int. Cl.
*G06F 8/61* (2018.01)
*H04L 9/40* (2022.01)
*G06F 21/57* (2013.01)

(52) U.S. Cl.
CPC .............. *G06F 8/61* (2013.01); *G06F 21/572* (2013.01); *H04L 63/0853* (2013.01); *G06F 2221/033* (2013.01)

(58) Field of Classification Search
CPC .... G06F 8/61; G06F 21/572; G06F 2221/033; H04L 63/0853
See application file for complete search history.

(56) References Cited

U.S. PATENT DOCUMENTS

| | | | | |
|---|---|---|---|---|
| 8,136,090 B2 * | 3/2012 | Boss | ................... | G06F 9/44505 717/121 |
| 8,473,749 B1 * | 6/2013 | Madsen | ................ | H04W 12/35 726/28 |
| 8,566,820 B1 * | 10/2013 | Weathersby | .............. | G06F 8/61 717/177 |
| 8,904,368 B2 * | 12/2014 | Haenel | ................ | G06F 9/44547 717/148 |
| 9,632,765 B1 * | 4/2017 | Falcone | .................. | H04L 43/06 |
| 10,320,940 B1 * | 6/2019 | Brennan | ................. | H04L 67/32 |
| 10,652,281 B1 * | 5/2020 | Moolenaar | .......... | H04L 63/0236 |
| 10,698,671 B2 * | 6/2020 | Velasco | ...................... | G06F 8/61 |
| 2005/0251786 A1 * | 11/2005 | Citron | ........................ | G06F 8/34 717/136 |
| 2006/0161914 A1 * | 7/2006 | Morrison | ................ | G06F 8/658 717/174 |
| 2008/0127170 A1 * | 5/2008 | Goldman | .................. | G06F 8/61 717/174 |

(Continued)

OTHER PUBLICATIONS

Jones, M. et al. "JSON Web Token (JWT)" (RFC 7519), May 2015. (Year: 2015).*

(Continued)

*Primary Examiner* — Michael Simitoski
(74) *Attorney, Agent, or Firm* — FisherBroyles, LLP

(57) ABSTRACT

The disclosed computer-implemented method for improving application installation may include (i) receiving, in response to initiating an installation procedure for an application published by a security application publisher, a signed web token that is formatted according to an Internet standard that defines a structure of the signed web token such that a private section of a payload of the signed web token asserts at least one private claim, and (ii) applying the private claim to customize the installation procedure of the application according to a configuration of a technology partner that partners with the security application publisher. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2009/0313619 | A1* | 12/2009 | Parthasarathy | G06F 8/61 717/178 |
| 2010/0242034 | A1* | 9/2010 | Rugh | G06F 8/61 717/172 |
| 2012/0180036 | A1* | 7/2012 | Ran | G06F 8/60 717/171 |
| 2012/0284704 | A1* | 11/2012 | Friedman | G06F 9/4451 717/177 |
| 2012/0317564 | A1* | 12/2012 | Lee | G06F 8/61 717/175 |
| 2013/0139271 | A1* | 5/2013 | Arrelid | G06Q 20/1235 726/27 |
| 2014/0181801 | A1* | 6/2014 | Voronkov | G06F 8/61 717/177 |
| 2014/0196022 | A1* | 7/2014 | Skutin | G06F 8/61 717/176 |
| 2015/0160939 | A1* | 6/2015 | Filatov | G06F 21/56 717/174 |
| 2016/0036667 | A1* | 2/2016 | Kripalani | G06F 8/61 709/224 |
| 2019/0243627 | A1* | 8/2019 | Balar | G06F 21/45 |
| 2021/0216614 | A1* | 7/2021 | Toksoz | G06F 21/31 |

OTHER PUBLICATIONS

Wikipedia, "JSON Web Token", URL: https://en.wikipedia.org/wiki/JSON_Web_Token, as retrieved on Aug. 19, 2020, pp. 1-7.

JWT, "Introduction to JSON Web Tokens", URL: https://jwt.io/introduction/, as retrieved on Aug. 19, 2020, pp. 1-11.

\* cited by examiner

SYSTEMS AND METHODS FOR IMPROVING APPLICATION INSTALLATION

BACKGROUND

Software installation may involve more than publishing application binaries. Software installation may also involve configuration procedures for configuring settings. The timing of configuring such settings may pose challenges during an installation procedure. An additional complication may correspond to a scenario where a single binary is used by multiple different original equipment manufacturer channels for varying layouts, representational state transfer (REST) calls, and/or branding resources.

To perform a customization procedure, related systems may attach customization settings to a signed application installation package where the customization settings are external to the signed application installation package (e.g., the customization settings themselves are not signed). In such scenarios, the correctness of these customization settings may hinge upon an ability of a backend server for an application publisher to filter or reject appropriately configuration settings that are unrecognized. The present disclosure, therefore, identifies and addresses a need for systems and methods for improving application installation.

SUMMARY

As will be described in greater detail below, the present disclosure describes various systems and methods for improving application installation. In one example, a computer-implemented method for improving application installation may include (i) receiving, in response to initiating an installation procedure for an application published by a security application publisher, a signed web token that is formatted according to an Internet standard that defines a structure of the signed web token such that a private section of a payload of the signed web token asserts at least one private claim and (ii) applying the private claim to customize the installation procedure of the application according to a configuration of a technology partner that partners with the security application publisher.

In one embodiment, the technology partner may include an identity provider. In some examples, receiving the signed web token is performed in response to transmitting a previous signed web token to a service maintained by the security application publisher. In one embodiment, the previous signed web token was received from an authentication server of the technology partner.

In one embodiment, the previous signed web token was received from an authentication server of the technology partner in response to extracting an identity of the technology partner from a local installation package and authenticating, based on the extracting of the identity from the local installation package, with the authentication server of the technology partner.

In one embodiment, the signed web token may include a header, the payload, and a signature. In one embodiment, the payload may include both a public section that specifies values for predefined attributes according to the Internet standard and a private section that specifies values for user-customizable attributes. In one embodiment, the installation procedure relies on the private claim within the private section of the payload of the signed web token rather than relying on an appendix appended to a signed installation package for the installation procedure.

In one embodiment, the private claim specifies a branding resource. The branding resource may include (i) an icon customized to the technology partner, (ii) an image customized to the technology partner, (iii) an activation code customized to the technology partner, (iv) a uniform resource locator customized to the technology partner, and/or (v) a logo customized to the technology partner.

In one embodiment, a system for implementing the above-described method may include (i) a reception module, stored in memory, that receives, in response to initiating an installation procedure for an application published by a security application publisher, a signed web token that is formatted according to an Internet standard that defines a structure of the signed web token such that a private section of a payload of the signed web token asserts at least one private claim, (ii) an application module, stored in memory, that applies the private claim to customize the installation procedure of the application according to a configuration of a technology partner that partners with the security application publisher, and (iii) at least one physical processor configured to execute the reception module, and the application module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive, in response to initiating an installation procedure for an application published by a security application publisher, a signed web token that is formatted according to an Internet standard that defines a structure of the signed web token such that a private section of a payload of the signed web token asserts at least one private claim and apply the private claim to customize the installation procedure of the application according to a configuration of a technology partner that partners with the security application publisher.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
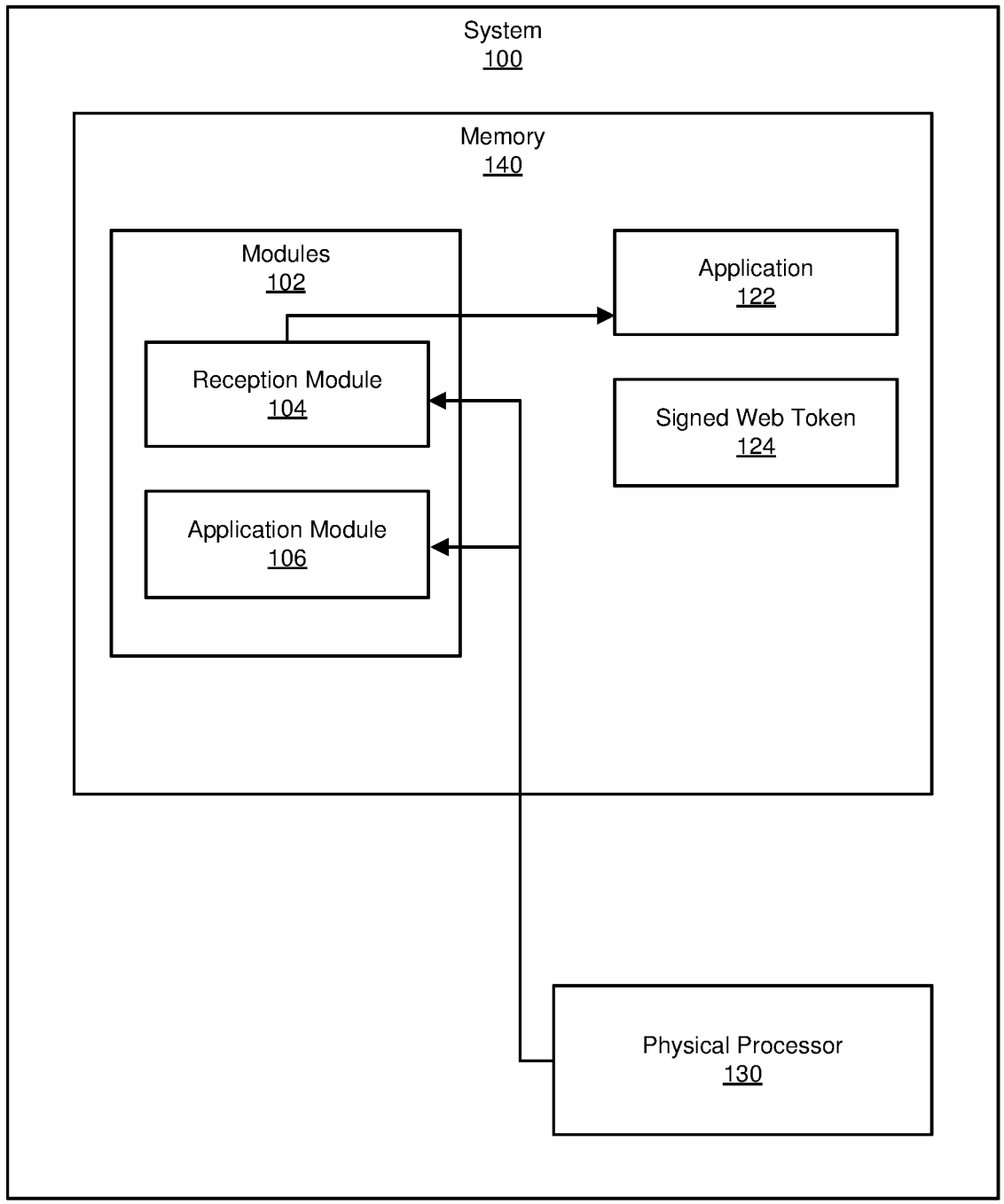
FIG. 1 is a block diagram of an example system for improving application installation.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for improving application installation. The disclosed subject matter may improve upon related technology by eliminating or bypassing a procedure of appending customization-specific settings to a signed application installation package. Because the appended customization-specific settings are not included within the signed application installation package, these settings do not benefit from the security and authenticity assurances of a corresponding digital signature. The appending procedure is also cumbersome and inconvenient, because the settings are external to the signed application installation package. In other words, in this related technology scenario, the correctness of the customization-specific settings that are appended to the application installation package relies exclusively upon the ability of a backend security server (e.g., a NortonLifeLock backend security server) to appropriately and accurately distinguish correct from incorrect settings, and to appropriately filter or reject incorrect settings. Nevertheless, the backend security server may have difficulty performing this task of filtering incorrect settings, because the settings may be maintained or governed by a third-party technology partner or original equipment manufacturer (e.g., a personal computer or smartphone manufacturer, or an Internet service provider) that partners with a corresponding security vendor rather than being maintained by the security vendor itself (e.g., NortonLifeLock). The improvement to installation procedures that is discussed below helps to address this problem by eliminating this brittle reliance on the ability of the backend server to distinguish correct from incorrect settings, especially when those settings are originally established and maintained by a third-party technology partner, an original equipment manufacturer, and/or an Internet service provider, as discussed in more detail below.

Figure 2:
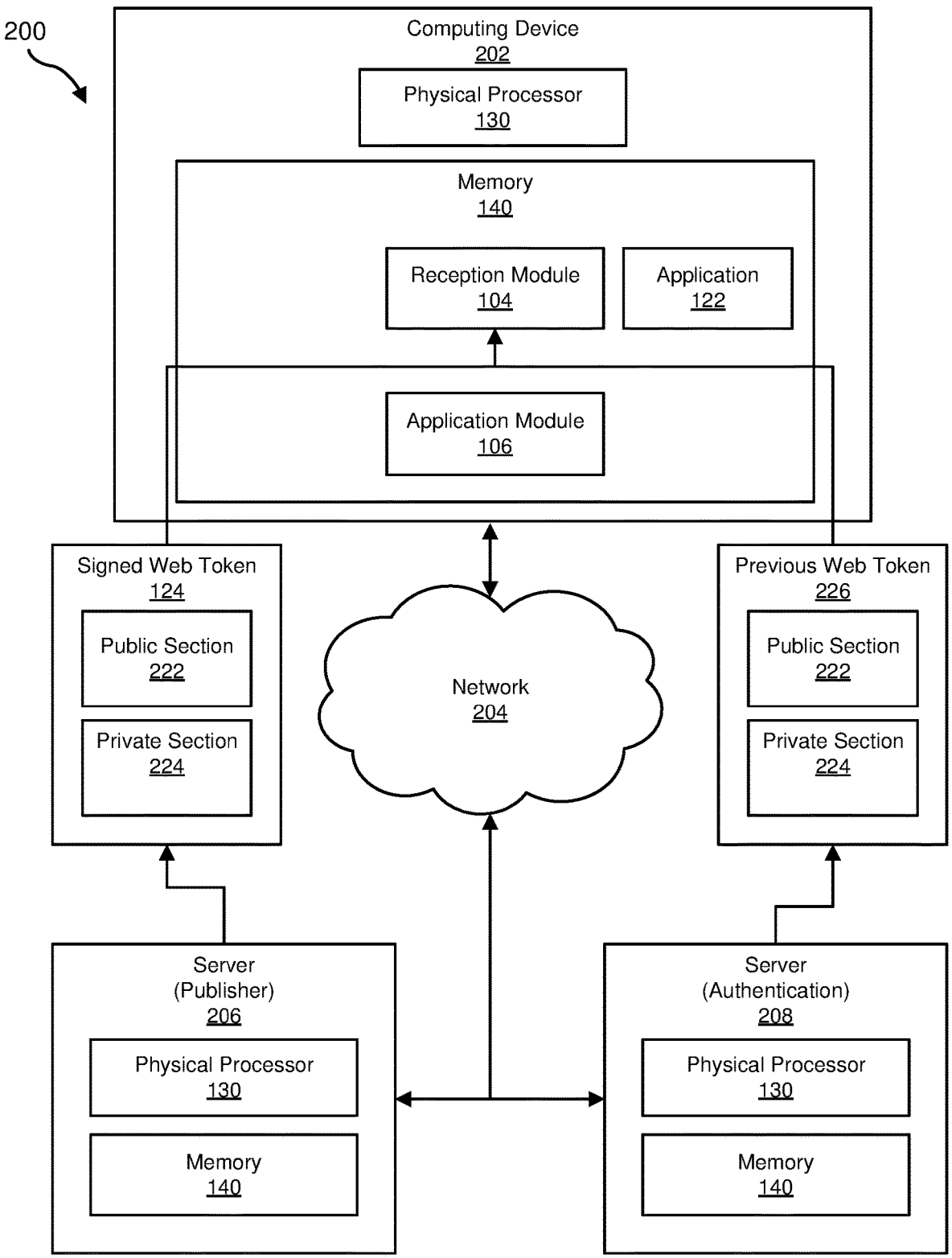
FIG. 2 is a block diagram of an additional example system for improving application installation.

The following will provide, with reference to FIGS. 1-2, detailed descriptions of example systems for improving application installation. Detailed descriptions of corresponding computer-implemented methods will also be provided in connection with FIGS. 3-4. In addition, detailed descriptions of an example computing system and computing network architecture capable of implementing one or more of the embodiments described herein will be provided in connection with FIGS. 5 and 6, respectively.

FIG. 1 is a block diagram of example system 100 for improving application installation. As illustrated in this figure, example system 100 may include one or more modules 102 for performing one or more tasks. For example, and as will be explained in greater detail below, example system 100 may include a reception module 104 that receives, in response to initiating an installation procedure for an application 122 published by a security application publisher, a signed web token 124 that is formatted according to an Internet standard that defines a structure of signed web token 124 such that a private section of a payload of signed web token 124 asserts at least one private claim. Example system 100 may additionally include an application module 106 that applies the private claim to customize the installation procedure of application 122 according to a configuration of a technology partner that partners with the security application publisher. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving application installation. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to improve application installation.

For example, and as will be described in greater detail below, reception module 104 may receive, in response to initiating an installation procedure for application 122 published by a security application publisher, which may maintain a server 206, signed web token 124 that is formatted according to an Internet standard that defines a structure of signed web token 124 such that a private section 224 of a payload of signed web token 124 asserts at least one private claim. Application module 106 may apply the private claim to customize the installation procedure of application 122 according to a configuration of a technology partner that partners with the security application publisher. In some further examples, server 206 may provide signed web token 124 to computing device 202 (where the installation procedure is taking place) in exchange for a previous web token 226, which may have been provided to computing device 202 from an authentication server 208, which may be maintained by an identity provider. As further shown in this figure, both signed web token 124 and previous web token 226 may include an instance of private section 224 and a public section 224.

Computing device 202 generally represents any type or form of computing device capable of reading computer-executable instructions. Generally speaking, computing device 202 may include any computing device that may involve a security application or other application published by a security vendor. Additional examples of computing device 202 include, without limitation, laptops, tablets, desktops, servers, cellular phones, Personal Digital Assistants (PDAs), multimedia players, embedded systems, wearable devices (e.g., smartwatches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300 by providing signed web token 124, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
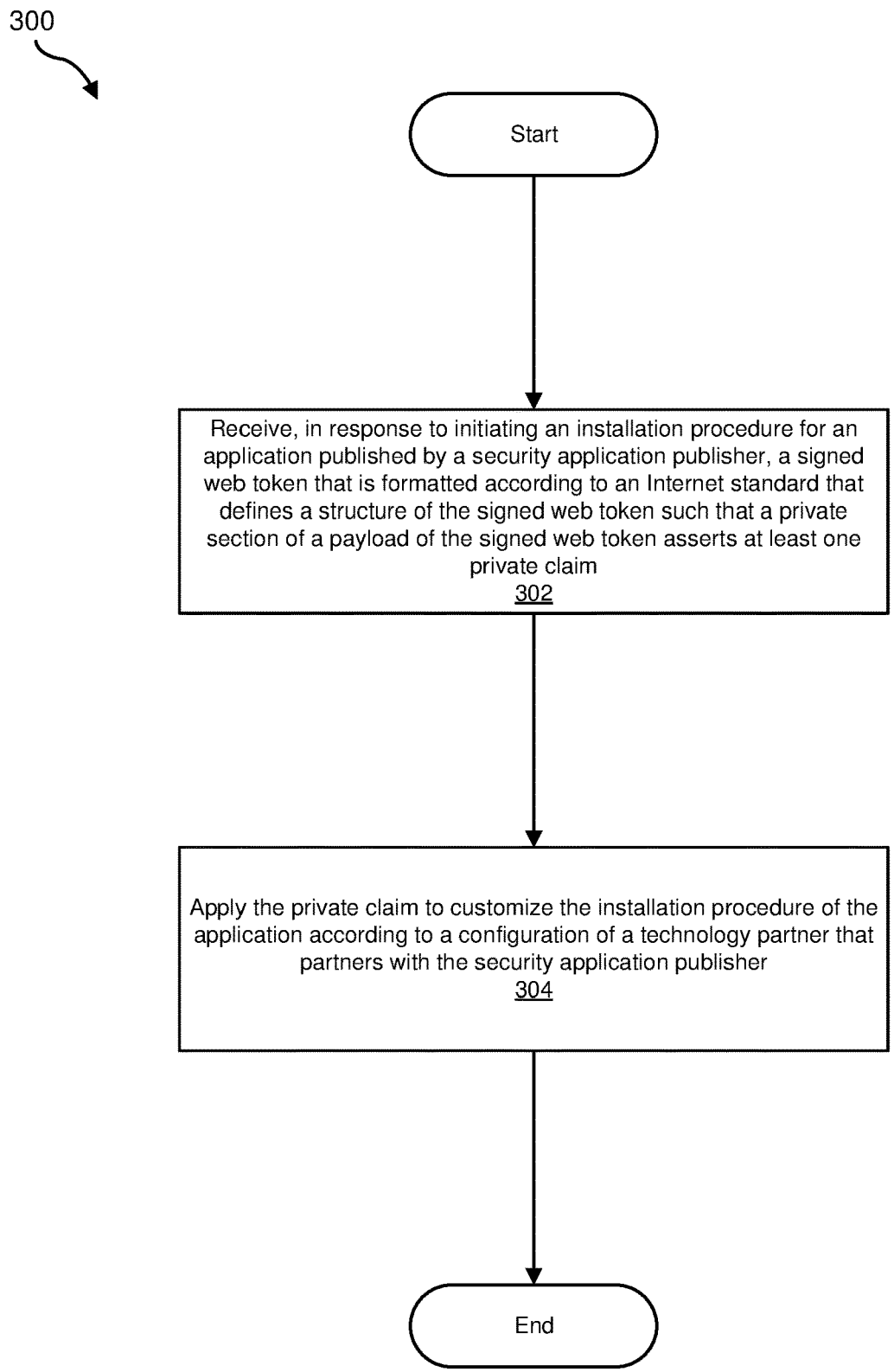
FIG. 3 is a flow diagram of an example method for improving application installation.

FIG. 3 is a flow diagram of an example computer-implemented method 300 for improving application installation. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, in response to initiating an installation procedure for an application published by a security application publisher, a signed web token that is formatted according to an Internet standard that defines a structure of the signed web token such that a private section of a payload of the signed web token asserts at least one private claim. For example, reception module 104 may, as part of computing device 202 in FIG. 2, receive, in response to initiating an installation procedure for application 122 published by a security application publisher, signed web token 124 that is formatted according to an Internet standard that defines a structure of signed web token 124 such that private section 224 of a payload of signed web token 124 asserts at least one private claim.

As used herein, the term "security application publisher" generally refers to any creator or vendor that sells or publishes software generally related to computing device security. Similarly, as used herein, the term "signed web token" generally refers to any data structure and/or network packet configured for transmission over the Internet, which has been digitally signed or otherwise signed using a cryptographic key, as discussed below.

As used herein, the term "Internet standard" generally refers to any formal standardization for network communications over the Internet. One illustrative example of the Internet standard of step 302 may correspond to the "JSON Web Token (JWT)" Internet standard. This Internet standard may establish procedures for creating data with optional signature and/or optional encryption whose payload holds JSON that asserts some number of claims. The tokens are signed either using a private secret or a public/private key. Moreover, as used herein, the term "claim" generally refers to any assertion or proposition that may be verified (e.g. signed) as part of an authentication/installation procedure, as discussed in more detail below. For example, a server could generate a token that has the claim "logged in as admin" and provide that to a client. The client could then use that token to prove that it is logged in as admin. The tokens can be signed by one party's private key (usually the server's) so that the party can subsequently verify that the token is legitimate. If the other party, by some suitable and trustworthy means, is in possession of the corresponding public key, they too are able to verify the token's legitimacy. The tokens are designed to be compact, URL-safe, and usable especially in a web-browser single-sign-on (SSO) context. JWT claims can typically be used to pass identity of authenticated users between an identity provider and a service provider, or any other type of claims as required by business processes. JWT relies on other JSON-based standards: JSON Web Signature and JSON Web Encryption.

As used herein, the term "public section" and "private section" simply refer to one or two sections of the payload of the signed web token of step 302. Generally speaking, the signed web token may include a payload that specifies registered claims, public claims, and private claims. Registered claims may refer to a set of predefined claims which are not mandatory but recommended, to provide a set of useful, interoperable claims. Some of them may include: iss (issuer), exp (expiration time), sub (subject), and (audience), and others. Public claims can be defined at will by those using JWTs. But to avoid collisions they should be defined in the Internet Assigned Numbers Authority JSON Web Token Registry or be defined as a Uniform Resource Identifier that contains a collision resistant namespace. Private claims (i.e., corresponding to the private section of the payload) may refer to custom claims created to share information between parties that agree on using them and are neither registered nor public claims. Generally speaking, the payload may optionally include both a public section that specifies values for predefined attributes according to the Internet standard and a private section that specifies values for user-customizable attributes. In addition to the payload, which may include the private claims, as discussed above, the signed web token may also include a header and/or a signature such as a digital signature.

Reception module 104 may receive the signed web token in a variety of ways. In some examples, reception module 104 may receive the signed web token in response to transmitting a previous signed web token to a service maintained by the security application publisher. For example, reception module 104 may receive signed web token 124 in response to previously transmitting previous web token 226 to server 206. Moreover, prior to that, reception module 104 may have received previous web token 226 from authentication server 208. Authentication server 208 may have provided previous web token 226 to computing device 202 to verify an identity of the user attempting to perform the installation procedure of method 300. For example, authentication server 208 may correspond to an identity provider backend server, and previous web token 226 may verify the identity of the user.

At step 304, one or more of the systems described herein may apply the private claim to customize the installation procedure of the application according to a configuration of a technology partner that partners with the security application publisher. For example, application module 106 may, as part of computing device 202 in FIG. 2, apply the private claim to customize the installation procedure of application 122 according to a configuration of a technology partner that partners with the security application publisher.

As used herein, the phrase "apply the private claim to customize the installation procedure" generally refers to a customizing procedure that adds specifics of variations for an application installation package that are tailored to a specific set of technology partners of the security application publisher of step 302. Generally speaking, a security application publisher such as NortonLifeLock may provide a single generic application installation package for its corresponding software products, such as NORTON MOBILE SECURITY. Nevertheless, the security application publisher may also partner with a number of different original equipment manufacturers, or other technology partners, to provide a customized or branded version of these corresponding software products. For example, if NortonLifeLock partnered with a computing device manufacturer or an Internet service provider, then NortonLifeLock may desire to customize or revise the generic application installation package for NORTON MOBILE SECURITY to include one or more settings, logos, branding details, graphics, and/or other metadata that are associated with the manufacturer as distinct from NortonLifeLock itself.

Similarly, as used herein, the term "technology partner" generally refers to any entity, individual, or business that forms a legal or business arrangement with the security application publisher in accordance with step 304. Illustrative examples of such technology partners may include retailers, Internet service providers, and/or original equipment manufacturers.

Application module 106 may apply the private claim in a variety of ways. As discussed above, the private claim may include any assertion or proposition that may be verified (e.g., through JWT or other web token signature). In some illustrative examples, the private claim may include a key-value pair. Generally speaking, the default configuration of JWT web let's talk porn conferences when you get a chance. We should go to one together, maybe even get a porn star even meet a porn star meet a porn star May define claims, such as private, public, or as for claims, in the form of key-value pairs.

Figure 4:
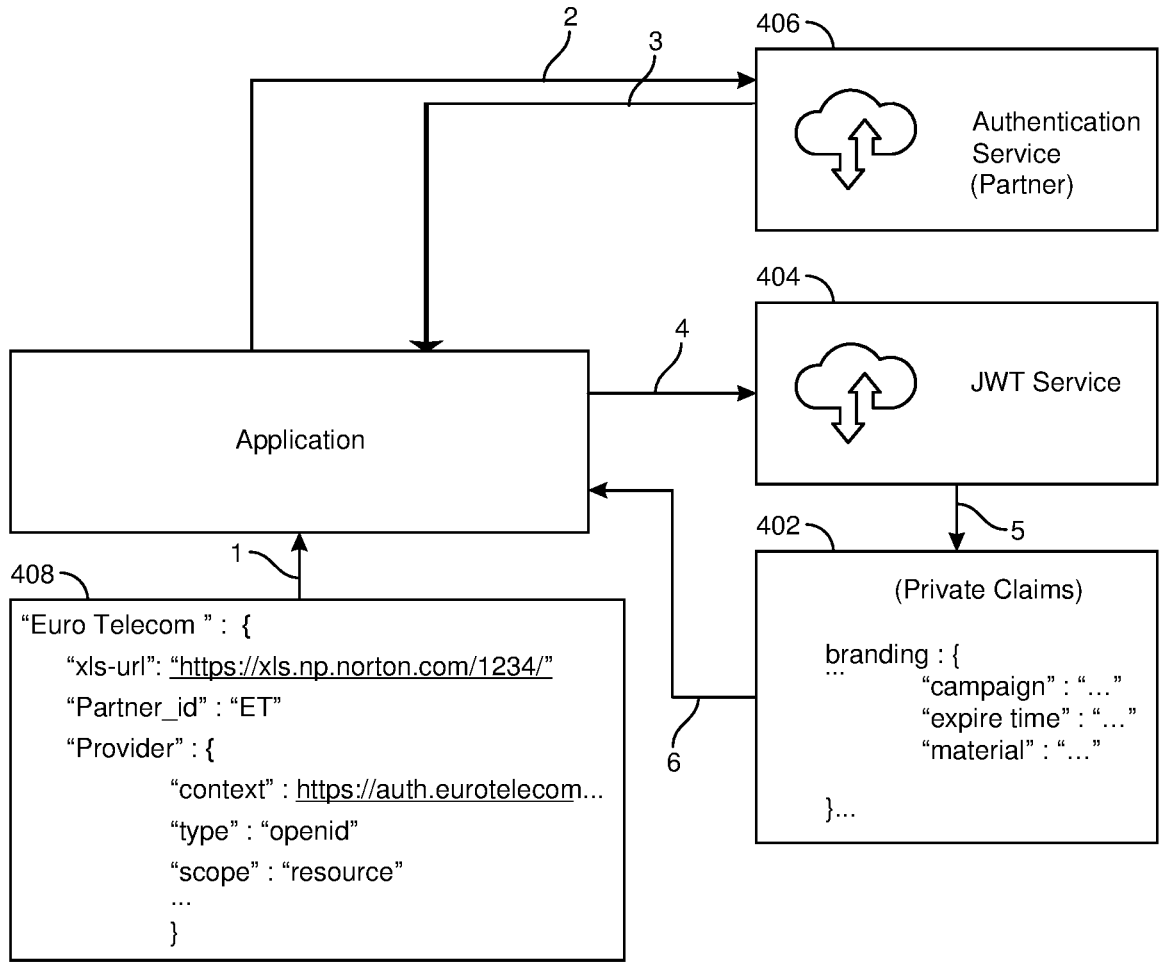
FIG. 4 is a block diagram of an example workflow for improving application installation.

FIG. 4 shows an example workflow that may correspond to one commercial embodiment of the inventive method 300 shown in FIG. 3. As further shown in this figure, the workflow may include a graphical representation of private claims 402. Private claims 402 may be formatted in accordance with key-value pairs. The example of this figure further shows that certain keys of these key-value pairs may include "campaign," "expire time," and "material." These keys may correspond to attributes that specify particular values (which may be arbitrary, and which are shown as " . . . " for simplicity). Moreover, this figure also further highlights how private claims 402 may all be included within the topic of "branding," as branding-specific customization values for attributes to perform a customization procedure of step 304. This figure also further shows how private claims 402 may be provided to computing device 202 from a signed web token service, such as JWT service 404, which may correspond to server 206, for example. Private claims 402 may also specify varying layouts and/or representational state transfer (REST) API calls, in addition to, or in the alternative to, the details of branding-customization settings, as illustrated by example in FIG. 4.

Moreover, in addition to the branding-specific details of private claims 402 shown in this figure, private claims 402 may also specify one or more different branding resources, including any permutation of (i) an icon customized to the technology partner, (ii) an image customized to the technology partner, (iii) an activation code customized to the technology partner, (iv) a uniform resource locator customized to the technology partner, and/or (v) a logo customized to the technology partner.

FIG. 4 also illustrates how providing private claims 402 to computing device 202 may be performed at the end of a six-step procedure, which may correspond to a somewhat more detailed embodiment of method 300 shown in FIG. 3. In particular, private claims 402 may be embedded within the private section of the payload of signed web token 122 at step six shown in this figure. Step six may be performed by a server 206 in response to, in exchange for, receiving previous web token 226 from computing device 202 at step four. Moreover, computing device 202 may have previously received previous web token 226 from an authentication service or authentication partner 406, which may correspond to authentication server 208 in FIG. 2. Furthermore, this figure also illustrates how authentication service 406 may have provided previous web token 226 from computing device 202 in exchange for, or in response to, receiving an authentication request. The authentication request may have been generated based on technology partner identification metadata 408, which may be extracted from a generic application installation package at computing device 202. Technology partner identification metadata 408 may specify one or more items of metadata regarding a technology partner of the software application publisher of step 302. This figure shows an example in which the technology partner may correspond to "Euro Telecom," and furthermore key value pairs of this metadata may specify values for attributes such as a uniform resource locator ("xls-url"), a technology partner identifier ("Partner_id"), and provider details ("Provider"). In some examples, authentication service 406 may correspond to, or overlap with, the technology partner that partners with the security application publisher of method 300, and in other examples these may be logically or legally distinct. In some specific examples, the technology partner may include an identity provider and/or the Internet service provider, as further discussed above.

As further discussed above, the disclosed subject matter may improve upon related technology by eliminating or bypassing a procedure appending customization-specific settings to a signed application installation package. Because the appended customization-specific settings are not included within the signed application installation package, these settings do not benefit from the security and authenticity of a corresponding digital signature. The appending procedure is also cumbersome and inconvenient, because it is external to the signed application installation package. In other words, in this related technology scenario, the correctness of the customization-specific settings that are appended to the application installation package relies exclusively upon the ability of a backend security server (e.g., a NORTON backend security server) to appropriately and accurately distinguish correct from incorrect settings, and to appropriately filter or reject incorrect settings. Nevertheless, the backend security server may have difficulty performing this task of filtering incorrect settings, because the settings may be maintained or governed by a third-party technology partner or original equipment manufacturer (e.g., a personal computer or smartphone manufacturer) that partners with a corresponding security vendor rather than being maintained by the security vendor itself (e.g., Norton). The improvement to installation procedures that is discussed below helps to address this problem by eliminating this brittle reliance on the ability of the backend server to distinguishing correct from incorrect settings, especially when those settings are originally established and maintained by a third-party technology partner or original equipment manufacturer, as discussed in more detail below.

The above discussion provides a detailed overview of method 300 shown in FIG. 3. Additionally, or alternatively, the following discussion provides a more concrete and detailed overview of one commercial implementation corresponding to method 300. Overall, the disclosed subject matter may embed configuration parameters as private claims within web tokens, such as JWT tokens, to secure software distribution and installation.

Signing with JWT tokens is a common practice for the defined purpose of authenticating a publisher's identity, such as the identity of NortonLifeLock. The disclosed subject matter may overload this related practice with enhanced semantics and in particular with the explicit intention of embedding configuration parameters as claims within a payload's private section to facilitate distribution installation. This all-inclusive one-stop procedure runs in contrast to the conventional three steps (i) initiate installation, (ii) update, and (iii) configure customization. The disclosed subject matter may replace this three-step procedure by using parameters of inherent security, where the inherent security is attributed to the placement of these parameters within JWT tokens.

NortonLifeLock's flagship products may include NORTON MOBILE SECURITY. The smartphone (e.g., ANDROID) package binary (APK) may be used by retail and various original equipment manufacturer channels. Retail users have default parameters during application configuration, whereas original equipment manufacturer distribution requires different sets of parameters to the security application publisher backend server. Because there may only be one version of the application installation package for each release, and this package is signed by the security application publisher before release, to accommodate the different technology partners or original equipment manufacturers, the application installation package may be attached to a set of key-value pairs, which are located external to the signed application installation package. The key-value pairs may be loaded after EULA consent as substitutes for default or implicit values in order to provide customized behaviors to accommodate the specifics of different branding or license schemes. In related technology, the correctness of these parameters exclusively depend on an ability of a backend security server to filter/reject unrecognizable key-value pairs.

JWT is an RFC standard, which refers to a common industry practice to sign software to verify authenticity. JWT web tokens may include three different parts: the header, the payload (where public and/or private claims may be stored), and/or the signature. The payload may be further divided into two sections: the public section which is composed of a fixed set of key-value pairs (e.g., claims) that are defined according to an RFC standard, and the private section that is extensible by third parties, such as third parties to partner with NortonLifeLock, as discussed above.

The disclosed subject matter may replace the current signing procedure with JWT web tokens configuration parameters embedded as private claims. During runtime, each layout may only absorb the private claims of its interest from the payload section. The mere fact that those parameters reside inside of JWT web tokens thereby provides that their authenticity is guaranteed at no extra cost. Furthermore, these parameters are available the moment a JWT web token authentication has passed, which is generally at a very early stage of the installation process.

Generally speaking, the authentication context can optionally be used to customize the configuration for that specific context. The JWT service (e.g., at NortonLifeLock) may thereby use this information from the authentication context when issuing a JWT token to complete the authentication procedure. One such example of an authentication context might be an authentication provider that is used for authentication (e.g., according to the OpenID and/or SAML protocols).

To clarify one example, one common scenario may involve a white-level product for a technology partner of a security application publisher. The technology partner would perform authentication using the technology partner's own authentication service. Subsequently, when the security application publisher issues a JWT web token from its JWT web token service, the security application publisher may not know which authentication provider was used and build private claims that configure the product specifically to that partnership. These private claims can be any links to specific branding material resources. After the JWT web token is created, it can be securely embedded in the application.

Figure 5:
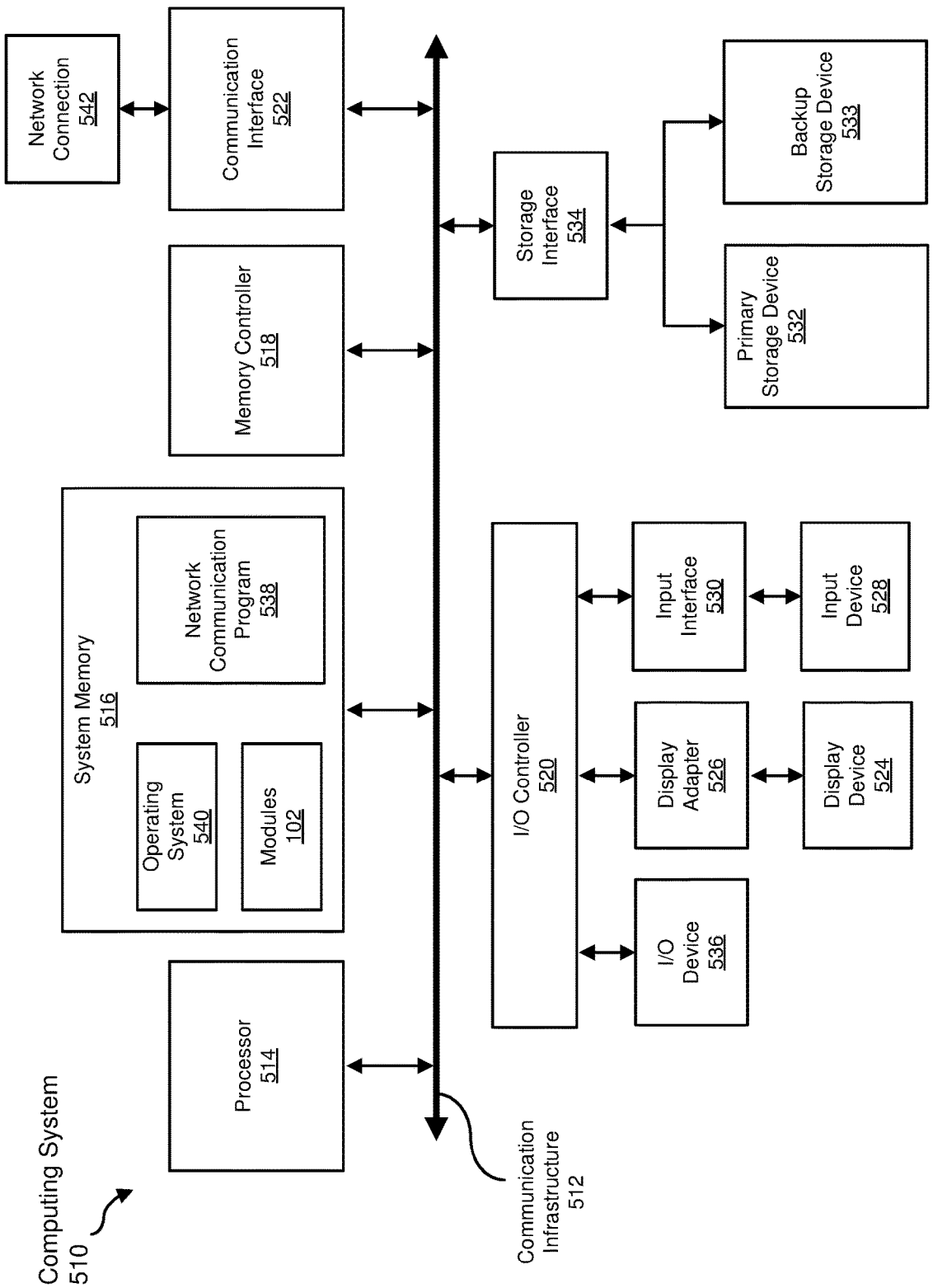
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
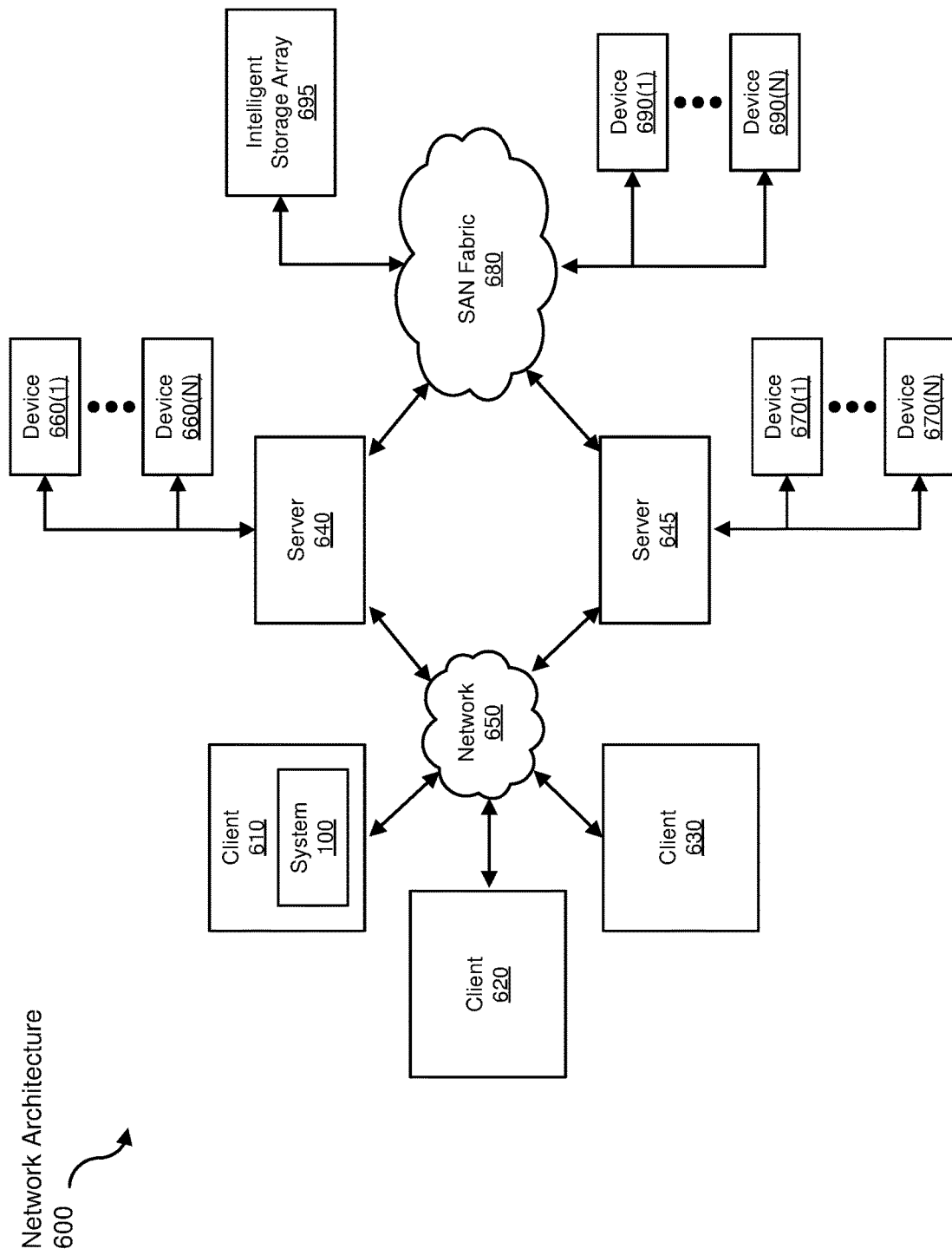
FIG. 6 is a block diagram of an example computing network architecture capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for improving application installation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving application installation, at least a portion of the method being performed by a computing device comprising at least one processor, the method comprising:
   receiving, in response to initiating an installation procedure for an application published by a security application publisher, a signed web token that is formatted according to an Internet standard that defines a structure of the signed web token such that a private section of a payload of the signed web token asserts at least one private claim; and
   applying the private claim to customize the installation procedure of the application according to a configuration of a technology partner that partners with the security application publisher;
   wherein receiving the signed web token is performed in response to transmitting a previous signed web token to a service maintained by the security application publisher.

2. The computer-implemented method of claim 1, wherein the technology partner comprises an identity provider.

3. The computer-implemented method of claim 1, wherein the Internet standard corresponds to the JSON Web Token (JWT) Internet standard.

4. The computer-implemented method of claim 3, wherein the previous signed web token was received from an authentication server of the technology partner.

5. The computer-implemented method of claim 3, wherein the previous signed web token was received from an authentication server of the technology partner in response to extracting an identity of the technology partner from a local installation package and authenticating, based on the extracting of the identity from the local installation package, with the authentication server of the technology partner.

6. The computer-implemented method of claim 1, wherein the signed web token comprises a header, the payload, and a signature.

7. The computer-implemented method of claim 6, wherein the payload comprises both a public section that specifies values for predefined attributes according to the Internet standard and the private section that specifies values for user-customizable attributes.

8. The computer-implemented method of claim 1, wherein the installation procedure relies on the private claim within the private section of the payload of the signed web token rather than relying on an appendix appended to a signed installation package for the installation procedure.

9. The computer-implemented method of claim 1, wherein the private claim specifies a branding resource.

10. The computer-implemented method of claim 9, wherein the branding resource comprises at least one of:

an icon customized to the technology partner;
an image customized to the technology partner;
an activation code customized to the technology partner;
a uniform resource locator customized to the technology partner; and
a logo customized to the technology partner.

11. A system for improving application installation, the system comprising:
   a reception module, stored in memory, that receives, in response to initiating an installation procedure for an application published by a security application publisher, a signed web token that is formatted according to an Internet standard that defines a structure of the signed web token such that a private section of a payload of the signed web token asserts at least one private claim;
   an application module, stored in memory, that applies the private claim to customize the installation procedure of the application according to a configuration of a technology partner that partners with the security application publisher; and
   at least one physical processor configured to execute the reception module and the application module;
   wherein the reception module is configured to receive the signed web token in response to the system transmitting a previous signed web token to a service maintained by the security application publisher.

12. The system of claim 11, wherein the technology partner comprises an identity provider.

13. The system of claim 11, wherein the Internet standard corresponds to the JSON Web Token (JWT) Internet standard.

14. The system of claim 13, wherein the previous signed web token was received from an authentication server of the technology partner.

15. The system of claim 13, wherein the previous signed web token was received from an authentication server of the technology partner in response to extracting an identity of the technology partner from a local installation package and authenticating, based on the extracting of the identity from the local installation package, with the authentication server of the technology partner.

16. The system of claim 11, wherein the signed web token comprises a header, the payload, and a signature.

17. The system of claim 16, wherein the payload comprises both a public section that specifies values for predefined attributes according to the Internet standard and the private section that specifies values for user-customizable attributes.

18. The system of claim 11, wherein the installation procedure relies on the private claim within the private section of the payload of the signed web token rather than relying on an appendix appended to a signed installation package for the installation procedure.

19. The system of claim 11, wherein the private claim specifies a branding resource.

20. A non-transitory computer-readable medium comprising one or more computer-readable instructions that, when executed by at least one processor of a computing device, cause the computing device to:
   receive, in response to initiating an installation procedure for an application published by a security application publisher, a signed web token that is formatted according to an Internet standard that defines a structure of the signed web token such that a private section of a payload of the signed web token asserts at least one private claim; and
   apply the private claim to customize the installation procedure of the application according to a configuration of a technology partner that partners with the security application publisher;
   wherein the computer-readable instructions are configured to cause the computing device to receive the signed web token in response to the computing device transmitting a previous signed web token to a service maintained by the security application publisher.

* * * * *